US005911408A

United States Patent [19]

Berends et al.

[11] Patent Number: 5,911,408

[45] Date of Patent: Jun. 15, 1999

[54] TRANSPORTABLE LIFT

[75] Inventors: Jan Berends; Jurjen Jan De Jong, both of Bultenpost, Netherlands

[73] Assignee: Stertil B.V., Kootstertille, Netherlands

[21] Appl. No.: 09/021,950

[22] Filed: Feb. 11, 1998

[51] Int. Cl.[6] .......... B60P 1/00

[52] U.S. Cl. .......... 254/2 B; 254/93 R; 254/93 H; 280/43.2; 280/43.23

[58] Field of Search .......... 254/2 B, 93 H, 254/89 H, 93 R; 280/43.2, 43.23, 767, 765.1

[56] References Cited

U.S. PATENT DOCUMENTS

| | | | |
|---|---|---|---|
| 2,592,091 | 4/1952 | Weaver | 254/2 B |
| 2,868,501 | 1/1959 | Cloud et al. | 254/2 B |
| 3,286,985 | 11/1966 | Edera | 254/2 B |
| 3,302,927 | 2/1967 | Gray | 254/2 B |
| 3,826,393 | 7/1974 | Carroll | 280/43.23 |
| 4,615,533 | 10/1986 | Sewell | 280/43.23 |
| 4,645,181 | 2/1987 | Schapansky | 254/2 B |
| 5,174,415 | 12/1992 | Neagle et al. | 280/43.23 |
| 5,184,930 | 2/1993 | Kuhn | 254/2 B |
| 5,484,134 | 1/1996 | Francis | 254/2 B |

*Primary Examiner*—James G. Smith
*Assistant Examiner*—Lee Wilson
*Attorney, Agent, or Firm*—Evenson, McKeown, Edwards & Lenahan, PLLC

[57] ABSTRACT

A transportable lift includes a base and an elevator connected to the base which is arranged to support and vertically lift a load relative to the base. Transport wheels are connected to the base and are vertically moveable relative to the base. A control mechanism is connected to a frame for the transport wheels to selectively disable transport when a load is on the elevator. The control mechanism includes a drive connected to the frame for the transport wheels which, in use, exerts a first transport enabling force on the frame. A counter drive is connected to the base and the drive which, in use, exerts a second force to compensate the first force and a weight of exclusively the lift.

14 Claims, 3 Drawing Sheets

TRANSPORTABLE LIFT

FIELD OF THE INVENTION

The invention relates to a transportable lift, for instance used for lifting an automobile or a bus in situ, where transportability is only maintained while no load, such as the above mentioned car or bus, is being lifted or at least supported by the lift.

BACKGROUND OF THE INVENTION

Such a lift is generally known, for instance the "car lifts" sold by Stertil B. V. from Kootstertille in the Netherlands. In these lifts a transportable base is used, on which a substantially upright stand is provided, along which a support for the object to be lifted can be moved. The base of this known lift is provided with at least one wheel forming a transporter, by means of which the lift is transportable.

Conventionally this wheel or at least one of the wheels is forced downward relative to the base of the lift, whereby the remaining parts of the lift are raised relative to the wheel. The entire lift then rests on said wheel, and is transportable. Conventionally a drive is used, acting on the transporter, and actuated by a user. This drive can for instance be embodied as a cylinder, which can be pressurized by the user, for instance by pumping fluid under pressure into the cylinder by means of a handle normally used to drag along the lift in transportable state.

In such a lift measures need to be taken in order to eliminate the possibility, that the lift can be rolled from its place, while a load is resting thereon. In the above mentioned configuration with a cylinder as a drive for the transporter the cylinder or other pressurized mechanism is provided with a pressure valve to release pressure in the cylinder, when the load exceeds a predetermined threshold value. This threshold value is then preferably selected as a value slightly higher than the one corresponding to the weight of the lift resting on its transporter. When the lift is being transported and the drive is actuated to secure, that the wheels are forced downward relative to the base, and the lift is being transported over an uneven surface, this uneven surface generates a number of shocks, all having an influence on the pressure valve such, that it will release pressure. This is not desired, as a user is then forced to repressurize the drive after only a short period of transport.

It is an object of the invention to provide a transportable lift with such a configuration, that it is not necessary to actuate or repressurize the drive of the transporter repeatedly, while transporting the lift.

It is another object of the lift according to the present invention, that an improved damping of shocks is achieved.

It is a further object of the present invention, that the configuration of the lift remain as compact, simple and economical as possible.

SUMMARY OF THE INVENTION

By means of a counter drive, where said drive is connected to said counter drive, and the drive and the counter drive are respectively connected to the transporter and the base, an equilibrium is reached and the wheels are extended downward, as long as the drive is actuated and the lift is not loaded. In an embodiment the drive and the counter drive are connected via a balance, thus enabling a more compact configuration, which is very simple and economical.

Preferably the drive and the counter drive have elastic characteristics, such that the equilibrium attained also provides an improved dampening of shocks. For instance the characteristics of a gas spring, especially its linearity of the spring force, make the gas spring a preferred choice for realizing the counter drive. This linearity enables a well defined behavior of the lift, which is relevant as only a part of the load actually rests on the transporter, so that behavior of the counter drive in a range of loads not exactly known previous to the load actually being applied. Thus the linearity, preferably with a low gradient to approach a constant, is desired to obtain a predictable response of the drive and the counter drive.

BRIEF DESCRIPTION OF THE DRAWINGS

The foregoing and other objects, advantages and features of the present invention will become apparent to those skilled in the art upon reading the detailed description of the preferred embodiments in conjunction with a review of the appended drawings, in which.

In the figures, corresponding components are designated by the same numerals.

DESCRIPTION OF THE PREFERRED EMBODIMENTS

Figure 1:
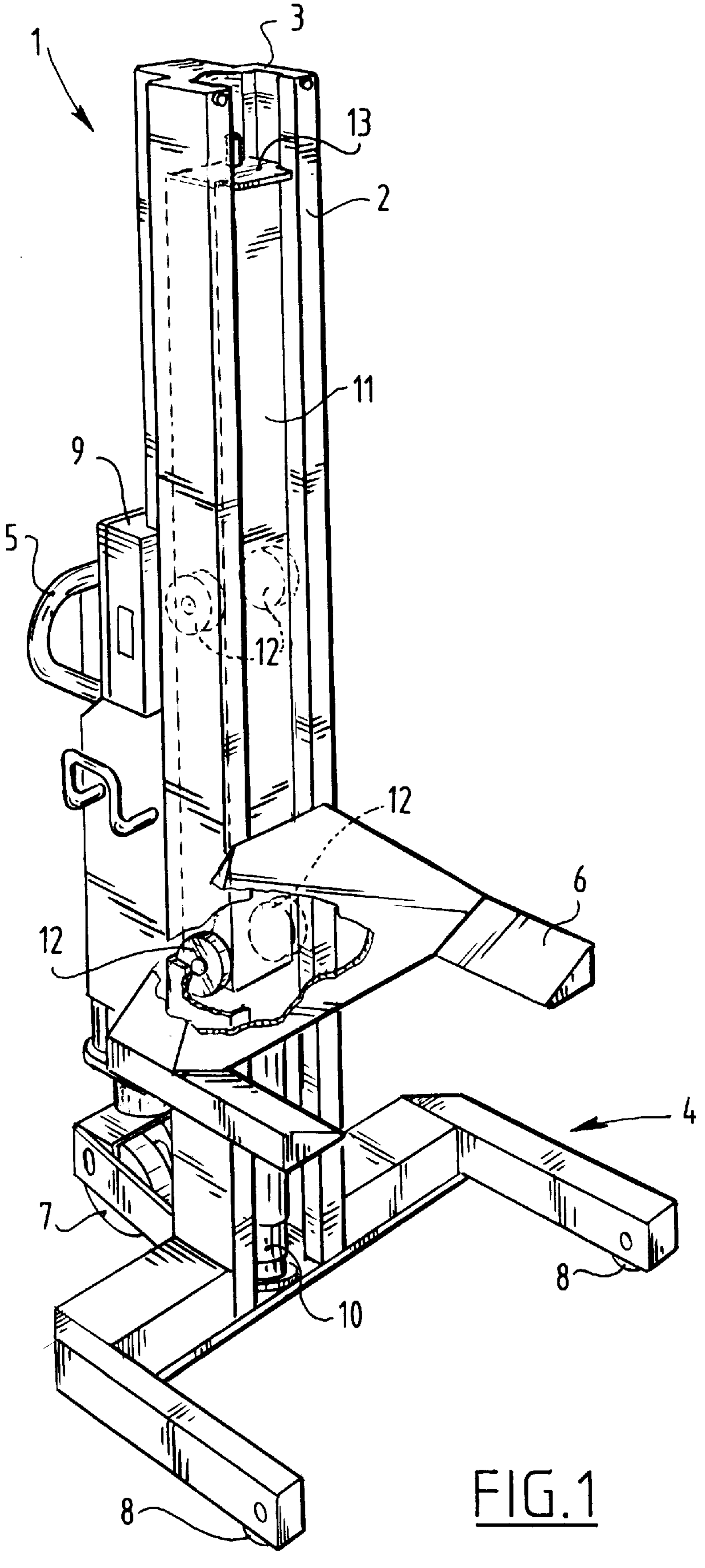
FIG. 1 is a representation in perspective view of a lift according to the present invention.

In FIG. 1 a lift according to the present invention is shown, which comprises a base 4, a stand 2 extending in an upward direction from said base 4 and a support 6 moveable along the stand 2.

The base 4 rests on transport wheels 7 and additional wheels 8 for transport of the entire lift 1.

A carriage 11 is arranged in the stand 2, which is formed by a C-shaped profile, of which the free ends are turned inward to form U-shaped portions of the C-shaped profile. This is shown more clearly in FIG. 2. Thus the stand 2 is hollow and the carriage 11 is moveable through the inside thereof. To this end the carriage 11 is provided with guide wheels 12, of which a pair is arranged at the lower side of this carriage 11, and another pair is arranged at approximately half the height of this carriage 11.

Below the carriage 11 a cylinder 10 is arranged in the stand 2 to impart an upward movement on the carriage 11. With the cylinder 10 the carriage can be pushed up or eased down, such that a load resting on the support 6, which is connected to the carriage 11, can be lifted or lowered to a desired height. The top of the stand is provided with a cover 3 intended to close off that section of the stand 2 formed by the C-shaped profile, complementing the area taken by a section of the carriage 11.

The lift 1 is provided with a grip 5 for a user, which serves to steer and possibly drag the lift during transport. Also the lift 1 is provided with a control 9, especially relevant for the situation where several of the lifts 1 shown here are to be driven synchronically in order to lift a vehicle in combination.

Figure 2:
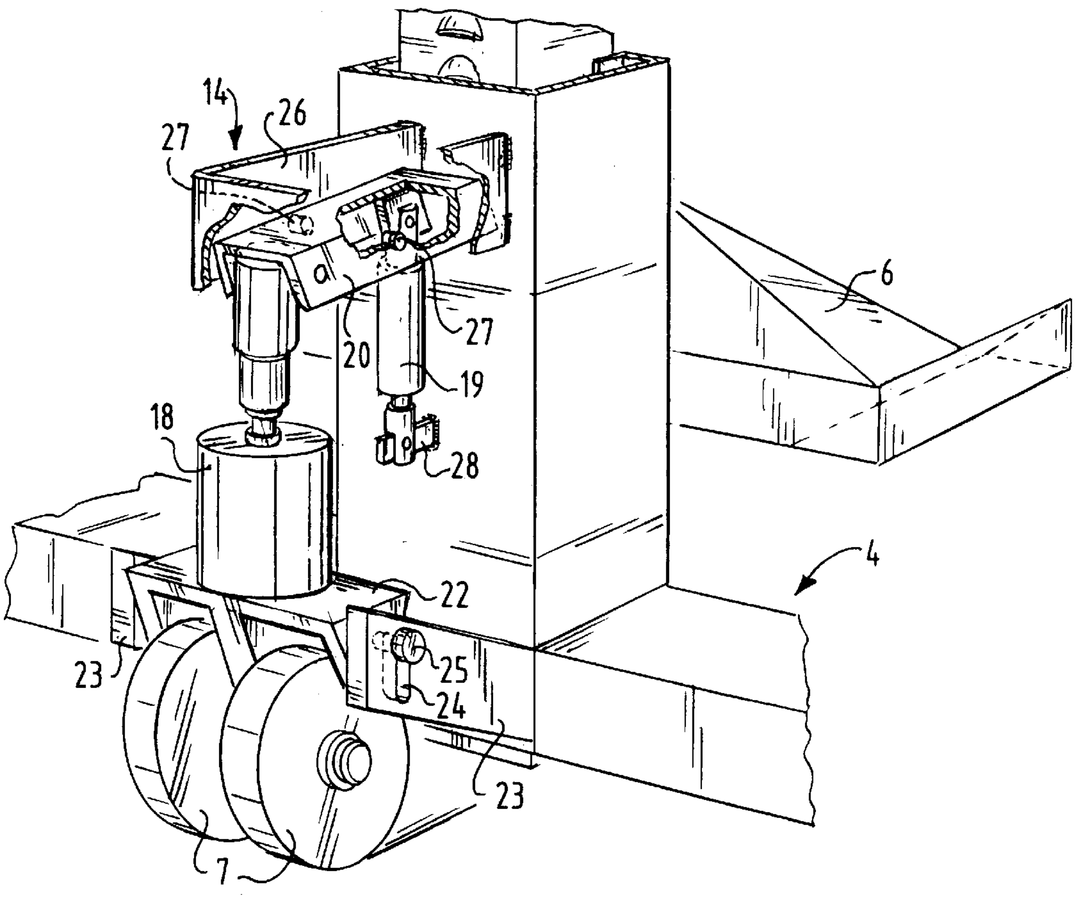
FIG. 2 is a representation in perspective view of a detail of the back of the lift shown in FIG. 1.

In the embodiment shown here the grip 5 can be used as a pump mechanism, which is connected to a container (not shown) of pressure fluid in order to drive the cylinder 18 shown in FIG. 2. Thus the wheels 7 can be extended in a downward direction to contact the floor and raise the remaining components of the lift 1 relative thereto. In FIG. 2 the cylinder 18 is connected to the pump mechanism (not shown) described above. It is to be noted here, that the cylinder 18 is a different cylinder to the one designated with reference numeral 10. Cylinder 10 driven by the control 9 corresponds to the lifting action of the support 6, whereas cylinder 18 relates to a means for forcing the wheels 7 downward and therefore the remaining components of the lift 1 upward in order to enable transport of the lift 1.

As a result the configuration, of which the cylinder 18 is a part, as shown in FIG. 2, is designated as the enable mechanism 14.

The wheels 7 are arranged in a frame 22, which is positioned between arms 23. The arms 23 are provided with slots 24, where the frame 22 is provided with pins 25. Thus the frame 22 can move up and downwards relative to the arms 23, which are attached to the base 4. Therefore the wheels 7 are moveable up- and downward relative to the remaining components of the lift 1 such that the lift can be raised from the ground on the wheels 7. This is accomplished by driving the cylinder 18 as discussed hereinabove. A pump mechanism (not shown) connected to the grip 5 and to the cylinder 18, is known per se in the art, therefore this connection is not described further here.

The cylinder 18 is arranged between the frame 22 and a balance 20, which balance is rotatably connected to a plate 26, which is folded around the balance 20. The plate 26 is provided with pins 27, on which the balance 20 is hinged. At the opposite side from the cylinder 18 a gas spring 19 is provided, which is rotatably connected to its side of the balance 20 and a strip 28.

The gas spring 19 is filled with gas under a predetermined pressure, at which the balance 20 is level, unless especially pressure is taken off the cylinder 18 or a load, such as a car or the like rests on the support 6. In the first case, which is depicted in this FIG. 2, the base 4 or the bottom side of the stand 2 rests on the ground, as no pressure is exerted by the cylinder 18 to push the wheels down relative to the base 4 of the stand 2. Without this pressure transporting lift 1 over the wheels 7 is inhibited as a result of the resistance provided by the bottom of the base 6 or the bottom side of the stand 2. As shown here, the balance 20 tilts downward at the side of the cylinder 18 but the wheels are not forced down. In the second case, where a load is resting on the support 6, and the cylinder 18 may be pressurized, where the wheels 7 are forced downward relative to the balance 20, such as to enable rolling of the lift 1 over the wheels 7. However, the gas spring 19 is compressed under the combined weight of the lift 1 and the load resting on the support 6, where the balance 20 then tilts downward at the side of the gas spring 19. Thus the dangerous situation, where the lift 1 can roll over its wheels 7, while a load is resting on the support 6, is inhibited.

Figure 3:
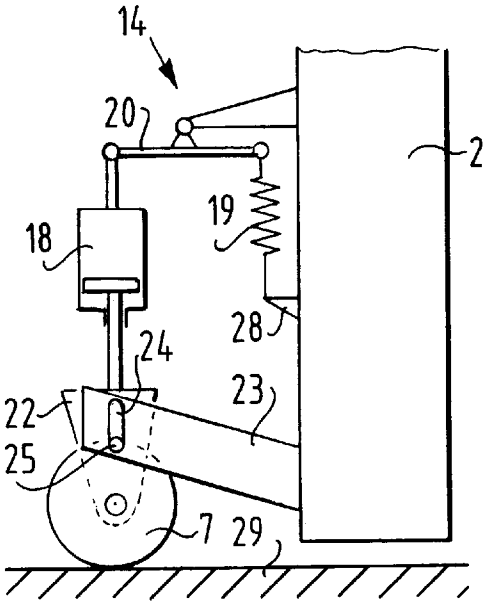
FIG. 3 is a schematic representation of the configuration according to FIG. 2.

FIG. 3 shows a schematic representation of the configuration of FIG. 2. Here the gas spring 19 is depicted as a normal coil spring, connected between the balance 20 and a connection 28 of the stand 2. The other free end of the balance 20 is connected to cylinder 18, which after receipt of fluid under pressure is extended to force the wheels 7 downward. To this end the wheels 7 are arranged in the frame 22, which is moveable in the arms 23, as the frame 22 is provided with pins 25 extending through the slots 24 in the arms 23. The connection of spring 19 to the stand 2 is accomplished by strip 28, which is stationary.

When the cylinder 18 is pressurized, the wheels 7 are forced downwards together with the frame 22. The spring 19 is sufficiently strong to compensate for the forces generated in this case, when only the weight of the lift 1 itself needs to be loaded onto the wheels 7.

When a weight, such as that of a car, is resting on the support 6, and optionally the cylinder 18 is provided with fluid under pressure, the force exerted by the spring 19 on the balance 20 as a result of the portion of the total weight not resting on wheels 8 is insufficient to prevent the balance 20 from tilting. Thus the side of the balance 20 cooperating with the cylinder 18 is raised and the side co-acting with the spring 19 is lowered. In such a case downward force on the wheels 7 is decreased and the capability of rolling or being transported of the lift is also lessened. Therefore the lift 1 can not be transported, while a load is resting on the support 6 thereof, as a result of the transport resisting contact of the bottom side of the stand 2 with the ground 29 or floor there beneath. One of the main novel and inventive features of this configuration according to FIGS. 2 and 3 is, that the enable mechanism 14 is very simple, compact and highly efficient with all the components thereof on the outside of the stand 2.

Figure 4:
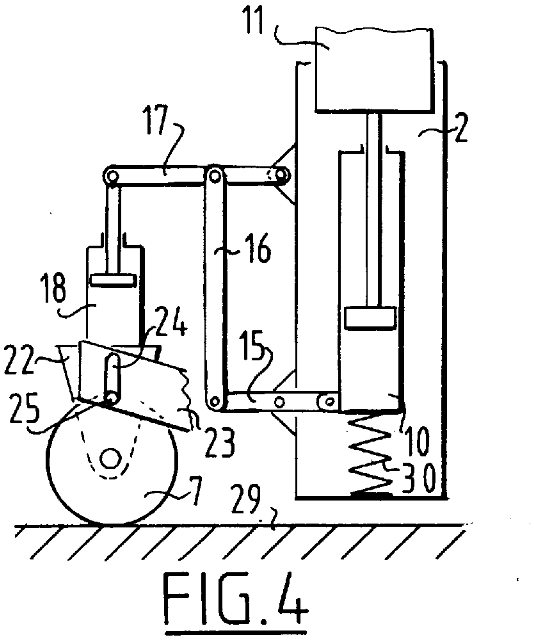
FIG. 4 is a schematic representation of a configuration in a first alternative relative to the one shown in FIG. 3.

FIG. 4 however shows an alternative configuration to the one shown in FIGS. 2 and 3, where a spring 30 in function corresponding to the gas spring 19 of FIG. 2, is arranged below the cylinder 10 inside the stand 2. Here also the spring 30 generates a sufficient force to maintain an equilibrium between the weight and the corresponding force exerted thereon and forces generated by cylinder 18 on wheels 7. Here also the connection between the spring 30 and the cylinder 18 comprises a balance 15, which on the one side is connected to the cylinder 10 in the stand 2, and on the other side is connected to a cantilever 17 via a connector beam 16. Here also the spring 30 can be a gas spring, although it is depicted here as a coil spring.

The force exerted by the spring 30 is transferred through balance 15 and connector beam 16 onto the cantilever beam 17 to keep it in the substantially horizontal position, as shown here in FIG. 4. In the meantime cylinder 18 exerts an upward force on the cantilever beam 17, in order to force the wheels 7 down. The situation shown here in FIG. 4 is maintained, irrespective of any supply of liquid or fluid under pressure to the cylinder 18 under influence of the spring 30. However, when load on the spring 30 is higher than merely the weight of the cylinder 10 and/or parts connected thereto, the spring 30 is compressed, thereby tilting the balance 15 forcing the connector beam 16 upward, together with the free end of the cantilever beam 17, such that pressure on wheels 7 is relieved. Especially when the length of the slots 24 is such, in relation to the extended length of the cylinder 18, the wheels 7 can in the present embodiment be raised positively off the ground 29, while the bottom side of the stand 2 is resting on this ground 29.

Figure 5:
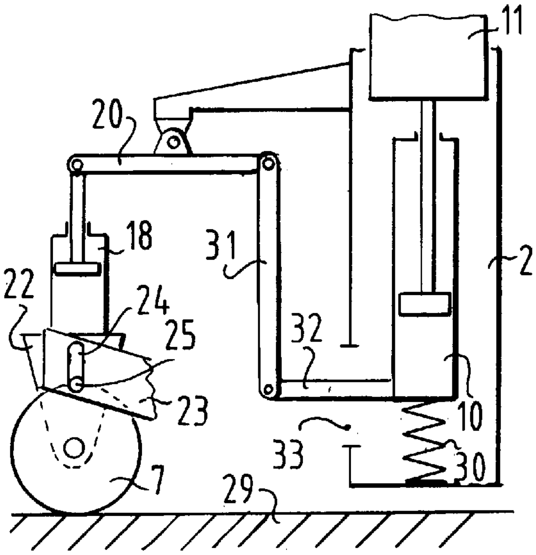
FIG. 5 is a schematic representation of a configuration as a second alternative relative to the one shown in FIGS. 3 and 4.

FIG. 5 shows yet another embodiment of a configuration according to the present invention in a schematic representation, where the balance 20 of FIG. 3 is also present here and this balance 20 is also connected on one side thereof to the cylinder 18. The other side of balance 20 is connected to a beam 32 attached to cylinder 10, where said cylinder 10 is resting on a spring 30. The beam 32 and the balance 20 are connected at the side opposite the cylinder 18 of the balance 20 by means of a connector beam 31. The beam 32 extends through a slot 33, in which the beam 32 can move in a vertical direction, especially downward relative to the position shown here. When the spring 30 is compressed under influence of the weight of a load resting on the cylinder 10, the carriage 11, the support 6, etcetera, the beam 32 is brought downward in a substantially identical position relative to the cylinder 10 as shown in this FIG. 5, but lowered relative to the stand 2 thus dragging the corresponding side of the balance 20 downward by means of the connector beam 31. Thus the force exerted on the wheels 7 by the cylinder 18 is decreased and transport of the lift, while it is carrying a load on the support 6, is inhibited.

Figure 6:
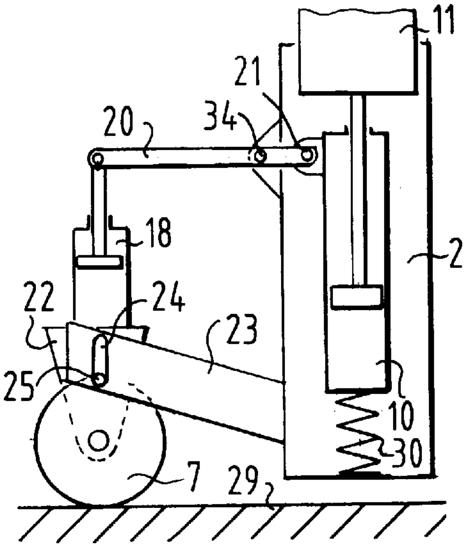
FIG. 6 is a schematic representation of a configuration as a third alternative relative to the one shown in FIGS. 3–5.

A further simplification of the configuration shown in FIG. 5 is visualized in FIG. 6. Here the balance 20 has its pivot 34 at the point, where it extends through the sidewall of the stand 2. The balance 20 is pivotally connected to the cylinder 10 in point 35 on one side, and is connected to the cylinder 18 at its opposite side, which is also a pivotable connection.

Here also the wheels 7 can be relieved, when the weight resting on the spring 30 is sufficiently high. In this case point 35 is dragged down and the balance 20 is tilted upward at the side of the connection thereof to the cylinder 18. Thus the cylinder 18 is free to extend, but pressure on the wheels 7 towards the ground 29 is reduced.

It is obvious, that the configuration shown in FIG. 6 is a considerable simplification of the one shown in FIG. 5 without any losses relating to efficiency or reliability, etcetera. Here also the length of the slots 24 in relation to the stroke of the cylinder 18 can be taken such, that it is possible to ensure, that the wheels 7 are lifted off the ground 29, irrespective of the pressure in or the active state of the cylinder 18. of course dimensioning of beams, balances and connection beams is very important in this respect, as compensation for this stroke of the cylinder 18 should be accomplished by a combination of the length of the slots 24 and dimensioning of the balances, connectors, and cantilevers used in the configurations described above. In order to positively raise the wheels 7 off the ground 29 play in this connecting assembly of beams, balances, cantilevers, etc. should be such, that the stroke of the cylinder 18 is at least compensated for by this assembly and slots 24.

An example of this is the configuration shown in FIG. 6, where the distance between the pivot 34 and the point 21, where the balance 20 is connected to the cylinder 10, is small relative to the distance between the pivot 34 and the connection of the balance 20 to the cylinder 18. Thus a small displacement of the point 21 in downward direction results in a relatively big upward movement of the opposite end of the balance 20, thus positively raising the wheels 7 off the ground 29. Also in other embodiments discussed herein above or not at all, the balance can be provided with a pivot point, which is not exactly centered relative to the length of the balance. In this way a controlled transfer of forces generated in the lift is achieved.

Although all of the embodiments above relate to a configuration with a balance, it is also possible to arrange the counter drive directly in contact with the drive. The drive and the counter drive may then be arranged in line in stead of parallel at a distance. Also instead of a spring or a gas spring a cylinder connected to an expansion tank could be employed, as well as any other means suitable to be used as a counter drive. Thus it is apparent to a person skilled in the art, that the appended claims should not be limited to the embodiments disclosed hereinabove.

We claim:

1. A transportable lift comprising:

a stand;

a carriage connected to said stand, said carriage being arranged to support and vertically lift a load relative to said stand;

transport elements connected to said stand, said transport elements being vertically moveable relative to said stand;

an enable mechanism connected to said transport elements to selectively disable transport when a load on said carriage is present;

said enable mechanism comprising a drive connected to said transport elements, said drive in use exerting a first transport enabling force on said transport elements and a counter drive connected to said stand and said drive, said counter drive in use exerting a second force sufficient to prevent contact of said transport elements with the around or floor therebeneath when the load is not present on said carriage.

2. Lift according to claim 1, wherein said balance is connected at a first end to said drive and at a second end to said counter drive.

3. Lift according to claim 1, wherein said enable mechanism further comprises a balance pivotally connected to said stand so that said drive and said counter drive are connected via said balance.

4. Lift according to claim 1, wherein said counter drive comprises a spring.

5. Lift according to claim 1, wherein said counter drive comprises a gas spring.

6. Lift according to claim 1, wherein said drive comprises a cylinder.

7. Lift according to claim 3, wherein an intermediate location of said balance is connected to said stand.

8. Lift according to claim 3, wherein said balance is interconnected with a cantilever extending between said stand and said drive.

9. Lift according to claim 3, wherein said counter drive is arranged in said stand to support and guide said support.

10. Lift according to claim 9, wherein said balance is formed by at least one rod extending through said stand.

11. Lift according to claim 10, where said balance is hinged at a passage in said stand through which said balance extends.

12. Lift according to claim 11, and further comprising a lift cylinder adapted to move the carriage in order to lift the load relative to the stand, wherein said balance is interconnected with said lift cylinder.

13. Lift according to claim 3, and further comprising a lift cylinder adapted to move the carriage in order to lift the load relative to the stand, wherein said balance is connected to said lift cylinder via a plurality of beams.

14. Lift according to claim 13, where one end of one of said beams is rotatably attached to said balance and an opposite end of the one of said beams is rotatably attached to another of said beams.

* * * * *